Figures 1, 2:
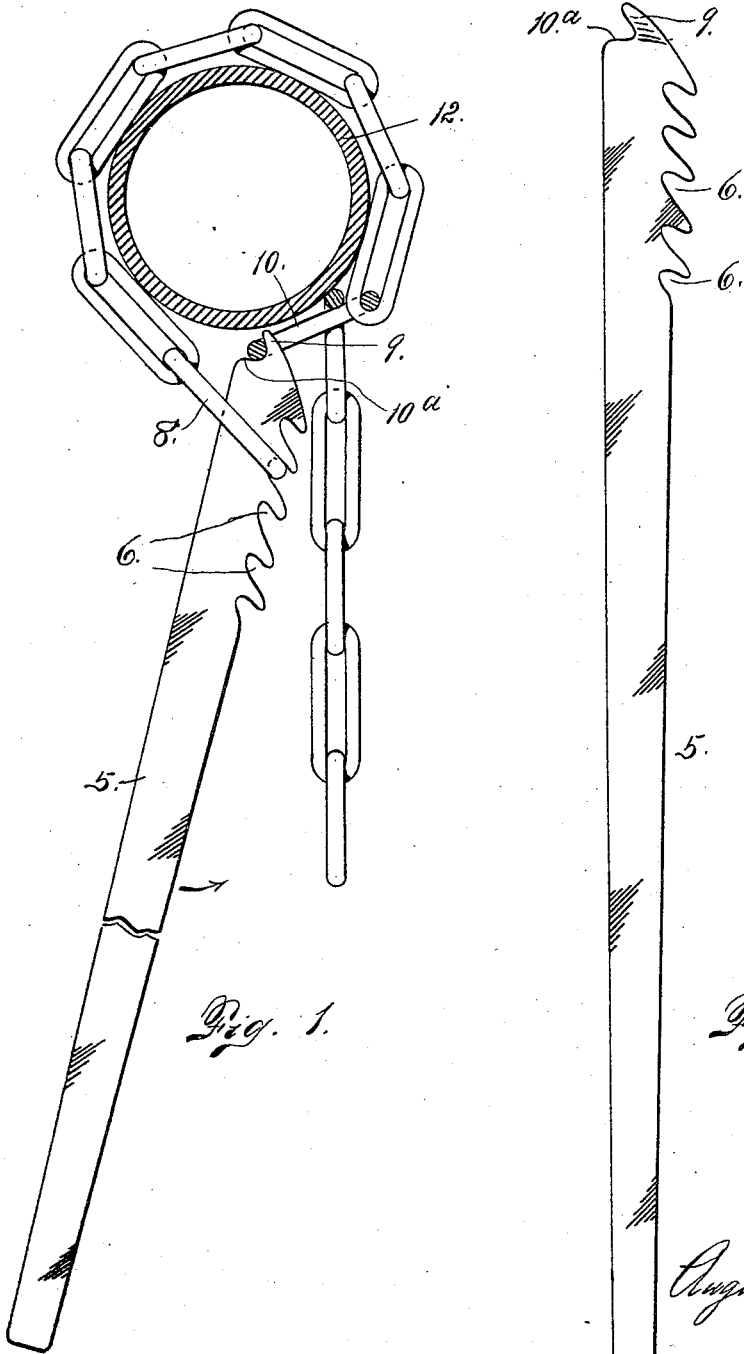

A. STENECH.
PIPE WRENCH.
APPLICATION FILED DEC. 27, 1904.

934,945.

Patented Sept. 21, 1909.

Witnesses
Otto E. Hoddick.
Dena Nelson.

August Stenech.
Inventor by
Attorney

UNITED STATES PATENT OFFICE.

AUGUST STENECH, OF LAFAYETTE, COLORADO.

PIPE-WRENCH.

934,945.  Specification of Letters Patent.  Patented Sept. 21, 1909.

Application filed December 27, 1904. Serial No. 238,297.

*To all whom it may concern:*

Be it known that I, AUGUST STENECH, a citizen of Austria-Hungary, residing at Lafayette, in the county of Boulder and State of Colorado, have invented certain new and useful Improvements in Pipe-Wrenches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pipe wrenches, my object being to provide an exceedingly simple device adapted to thoroughly and effectually perform the function of an article of this class.

The device broadly speaking consists of a toothed or notched lever arm and a chain. One link of the chain is adapted to engage a notch of the lever arm at a suitable distance from the operating extremity of the arm, the said extremity being provided with a part adapted to engage another link of the chain. By moving the lever arm the tendency of the power applied is to move the two links in opposite directions thus tightening the chain upon the pipe. It will be understood that the operating lever arm of the chain is not fixedly or permanently connected in any way. In other words the lever arm may be used with any chain to make a pipe wrench combination.

Having briefly outlined my improved construction as well as the function it is intended to perform, I will proceed to describe the same in detail reference being made to the accompanying drawing in which is illustrated an embodiment thereof.

In this drawing, Figure 1 is an elevation of my improved pipe wrench showing it applied to a pipe which is shown in section. Fig. 2 is a detail view of the lever arm.

The same reference characters indicate the same parts in all the views.

Let the numeral 5 designate a lever arm which may be of any suitable length. This arm is provided at one extremity with a number or series of notches 6 adapted to engage a link 8 of a chain. The extremity of the arm adjacent the notches 6, is provided with an oppositely disposed notch $10^a$ adapted to engage a link 10 of a chain, the links 8 and 10 being separated according to the diameter of the pipe 12 to which the wrench is applied.

It will be observed by means of this construction that any desired leverage may be obtained according to the position of the link 8 with reference to the notch $10^a$. In other words the nearer the link 8 is when connected with a notch 6 of the arm, to the notch $10^a$, the greater will be the leverage or operating advantage in the use of the tool. It will be understood that the point on the arm 5 where the link 8 engages the latter, is the fulcrum while the power is applied at the point $10^a$. The nearer these two points are together the greater will be the leverage or advantage.

From the foregoing description the use and operation of my improved device will be readily understood. The chain is placed around the pipe to which the device is to be applied, and one link as 8 made to engage one of the notches 6 of the lever arm, while a link 10 is made to engage the oppositely disposed notch $10^a$, in which event by moving the lever arm in the direction indicated by the arrow in Fig. 1, the chain will be tightened upon the pipe.

Having thus described my invention, what I claim is:—

The combination in a chain wrench, of an independent arm provided with a number of notches, adapted when in operation to engage a link of the chain, the inner extremity of the arm beyond the notches being provided with a similar notch adapted to engage another link of the chain whereby the lever arm of the chain is tightened on the pipe for the purpose set forth.

In testimony whereof I affix my signature in presence of two witnesses.

AUGUST STENECH.

Witnesses:
DENA NELSON,
A. J. O'BRIEN.